(12) United States Patent
Park

(10) Patent No.: US 7,830,490 B2
(45) Date of Patent: Nov. 9, 2010

(54) LIQUID CRYSTAL DISPLAY

(75) Inventor: Min-Sang Park, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 208 days.

(21) Appl. No.: 11/297,661

(22) Filed: Dec. 9, 2005

(65) Prior Publication Data
US 2006/0146265 A1 Jul. 6, 2006

(30) Foreign Application Priority Data
Dec. 10, 2004 (KR) .............. 10-2004-0104507

(51) Int. Cl.
*G02F 1/1339* (2006.01)
*G02F 1/1333* (2006.01)
(52) U.S. Cl. .................. 349/153; 349/110
(58) Field of Classification Search .......... 349/53, 349/153, 110
See application file for complete search history.

(56) References Cited

U.S. PATENT DOCUMENTS

| | | | | |
|---|---|---|---|---|
| 5,905,559 A * | 5/1999 | Fujiwara et al. | ......... | 349/190 |
| 6,057,900 A * | 5/2000 | Ono et al. | ......... | 349/110 |
| 6,304,308 B1 * | 10/2001 | Saito et al. | ......... | 349/155 |
| 6,392,735 B1 * | 5/2002 | Tani | ......... | 349/156 |
| 6,466,294 B1 * | 10/2002 | Yamagishi et al. | ......... | 349/155 |
| 6,831,725 B2 * | 12/2004 | Niiya | ......... | 349/153 |
| 6,888,606 B2 * | 5/2005 | Hinata et al. | ......... | 349/149 |
| 6,943,863 B2 * | 9/2005 | Fujioka et al. | ......... | 349/153 |
| 2001/0004278 A1 | 6/2001 | Fukumori et al. | | |

FOREIGN PATENT DOCUMENTS

| | | |
|---|---|---|
| CN | 1266199 | 9/2000 |
| JP | 02-220032 | 9/1990 |
| JP | 03-020318 | 2/1991 |
| JP | 08-022015 | 1/1996 |
| JP | 2003-098532 | 4/2003 |
| KR | 1999-0014105 | 4/1999 |

(Continued)

OTHER PUBLICATIONS

Chinese Office action corresponding to Chinese Patent Application No. CN200510131409.8, dated on Jun. 29, 2007.(with English translation).

(Continued)

*Primary Examiner*—James A Dudek
(74) *Attorney, Agent, or Firm*—Robert E. Bushnell, Esq.

(57) ABSTRACT

A liquid crystal display comprises a lower substrate, multiple seal patterns formed on the lower substrate and including spacers and sealant, and an upper substrate sealed by the multiple seal patterns. Spacers of one seal pattern, formed on wiring, of the multiple seal patterns comprise conductive spacers so that conductivity is improved while a cell gap between two substrates is stably maintained by sealing the substrates using a conductive seal pattern and a seal pattern for maintaining the gap. Furthermore, the liquid crystal display is capable of maintaining a cell gap between the two substrates more stably by forming black matrices on a front surface of the substrate in a pixel region of the liquid crystal display, thereby relieving a bump on the upper substrate.

17 Claims, 3 Drawing Sheets

FOREIGN PATENT DOCUMENTS

| | | |
|---|---|---|
| KR | 2003-0058769 | 7/2003 |
| WO | 9816867 | 4/1998 |

OTHER PUBLICATIONS

Korean Office Action for Korean Patent Application No. 2004-0104507 issued on Aug. 23, 2006.

Office action from the Japanese Patent Office issued in Applicant's corresponding Japanese Patent Application No. 2005-199019 dated Oct. 7, 2008.

* cited by examiner

LIQUID CRYSTAL DISPLAY

CLAIM OF PRIORITY

This application makes reference to, incorporates the same herein, and claims all benefits accruing under 35 U.S.C. §119 from an application for LIQUID CRYSTAL DISPLAY earlier filed in the Korean Intellectual Property Office on 10 Dec. 2004 and there duly assigned Serial No. 10-2004-0104507.

BACK GROUND OF THE INVENTION

1. Technical Field

The present invention relates to a liquid crystal display and, more particularly, to a super twisted nematic (STN) liquid crystal display for improving conductivity between two substrates while maintaining a gap between cells of the two substrates.

2. Related Art

A liquid crystal display is a kind of flat panel display, and is widely applied to various fields as a device for displaying data using physical optics properties of liquid crystal. The liquid crystal display has low power consumption, can be formed in a light and thin type, and can be produced as a product having various sizes compared with other display devices.

A liquid crystal display can be classified into a twisted nematic liquid crystal display (TN-LCD) and a super twisted nematic liquid crystal display (STN-LCD) according to the degree of twisting of liquid crystals disposed in a space between two transparent substrates. There are many kinds of liquid crystal display.

The STN-LCD having a twisting angle of 240° to 270° is suitable for driving a passive matrix since change in the arrangement of liquid crystal molecules relative to change in voltage in the vicinity of a threshold voltage is high by using the fact that transmittance changes very rapidly with applied voltage.

Generally, a liquid crystal display is formed by positioning liquid crystals between two substrates on which a transparent electrode pattern is formed, and sealing the two substrate with a sealing material.

An STN liquid crystal display includes a seal pattern which is formed on an outer part of a display part of the lower substrate to seal an upper substrate and the lower substrate on which a transparent electrode pattern is formed. A plurality of spacers are spread, and liquid crystals are injected into cells of the two substrates so as to maintain a cell gap between the two substrates.

Particularly, the cell gap of the two substrates should be uniformly maintained over the entire surface of the substrates in the STN liquid crystal display differently from the TN liquid crystal display, since the STN liquid crystal display uses birefringence. If the cell gap between the two substrates is not maintained, color difference, stain, etc. are generated on a screen. Therefore, non-conductive spacers are formed in a seal pattern for sealing the two substrates. In addition, conductive spacers are further included in a certain part of the seal pattern, i.e., a part in which a wiring line is formed, so that the lower substrate and the upper substrate are electrically connected.

However, mixing of the conductive spacers and the non-conductive spacers has an influence on driving of the STN liquid crystal display since conductivity is lowered when electrically connecting the lower substrate and the upper substrate.

SUMMARY OF THE INVENTION

Therefore, in order to solve the foregoing problems of the prior art, it is an object of the present invention to provide a liquid crystal display with a seal pattern structure in which conductivity is improved as a result of maintaining a cell gap between an upper substrate and a lower substrate of the liquid crystal display.

In order to achieve the foregoing object, the present invention provides a liquid crystal display comprising: a lower substrate; multiple seal patterns formed on the lower substrate and comprising spacers and sealant; and an upper substrate sealed by the multiple seal patterns; wherein spacers of a seal pattern, formed on wiring, of the multiple seal patterns are conductive spacers.

The multiple seal patterns are formed as double seal patterns, and spacers of a seal pattern formed on wiring from the double seal patterns are conductive spacers.

The conductive spacer is a spacer selected from the group consisting of Au, Ag, Pd, Ni, ITO, IZO, and glass fiber coated with any one thereof.

The upper substrate comprises a substrate, a color filter layer formed on a pixel part region of the substrate, a transparent electrode pattern formed on a lower part of the color filter layer, and an alignment layer formed on a lower part of the transparent electrode pattern, wherein the color filter layer comprises color filter cells, and a black matrix positioned between the color filter cells.

The black matrix is, preferably, formed on a front surface of the substrate in addition to the pixel part region.

The multiple seal patterns are formed on a lower part of the black matrix.

The liquid crystal display is an STN liquid crystal display or a TFT liquid crystal display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
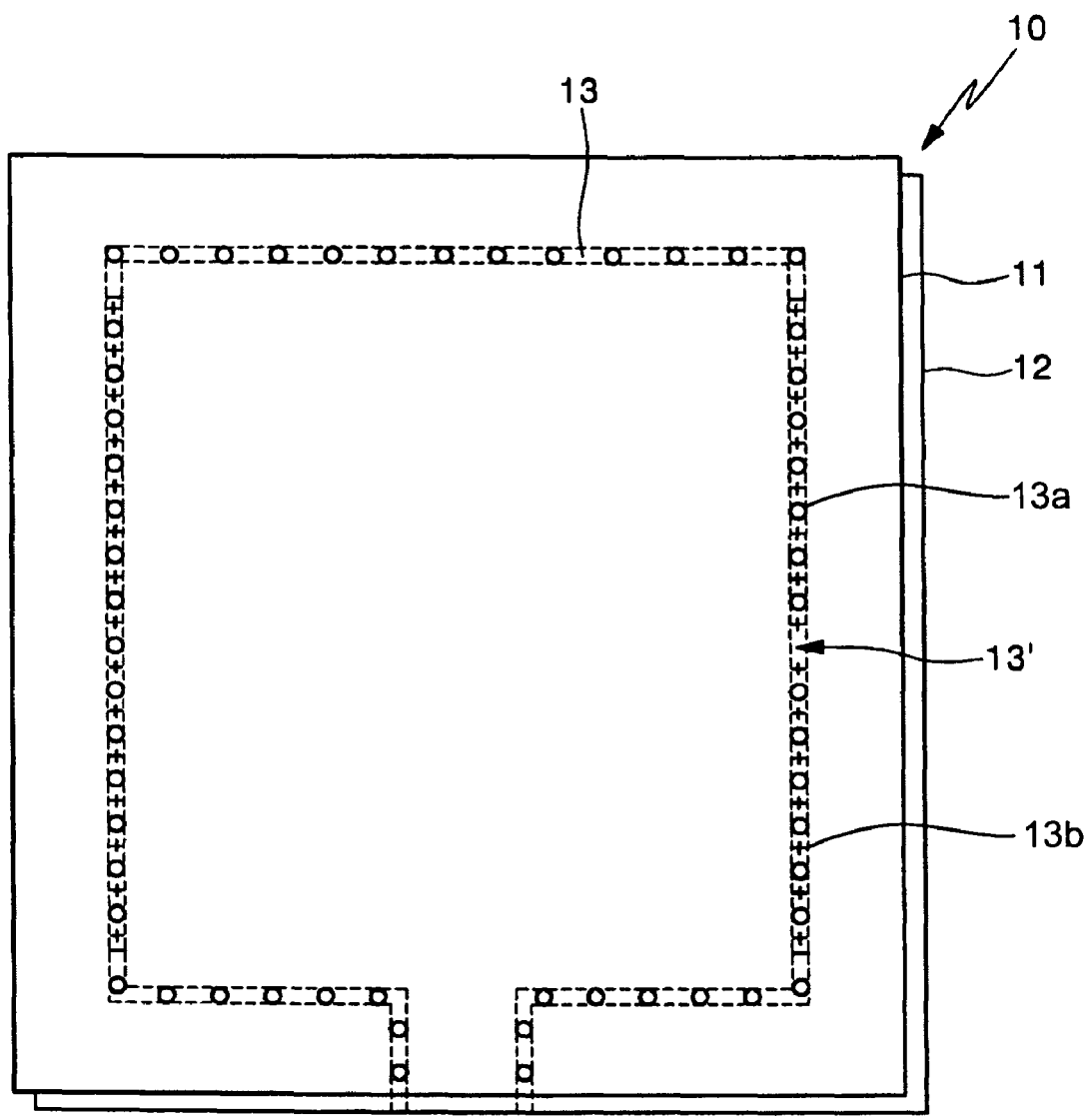
FIG. 1 is a block diagram of an STN liquid crystal display.

The present invention will now be described in detail in connection with preferred embodiments with reference to the accompanying drawings. For reference, like reference characters designate corresponding parts throughout several views. In the drawings, the length of layers and regions, thickness, etc. can be presented in an exaggerated manner for convenience in understanding. The same reference numbers are used to show the same elements throughout the specification.

FIG. 1 is a block diagram of an STN liquid crystal display.

As illustrated in FIG. 1, in the STN liquid crystal display 10, a seal pattern 13 is formed on an outer part of a display part of a lower substrate 12 so as to seal upper substrate 11 and lower substrate 12 on which a transparent electrode pattern is formed. Although not illustrated in FIG. 1, a plurality of spacers are spread and liquid crystals are injected into cells of two substrates 11 and 12 so as to maintain a cell gap between the substrates 11 and 12.

In particular, the cell gap between the two substrates 11 and 12 should be uniformly maintained over the entire surface of the substrates 11 and 12 in the STN liquid crystal display 10, in contrast to a TN liquid crystal display, since the STN liquid crystal display 10 uses birefringence. If the cell gap between the two substrates 11 and 12 is not maintained, color difference, stain, etc. are generated on a screen. Therefore, non-conductive spacers 13a (shown by the symbol "o" in FIG. 1) are formed in a seal pattern for sealing the two substrates 11 and 12. In addition, conductive spacers 13b (shown by the symbol "+" in FIG. 1) are further included in a certain part 13' of the seal pattern, i.e., a part in which a wiring line is formed, so that the lower substrate 12 and the upper substrate 11 are electrically connected.

Figure 2:
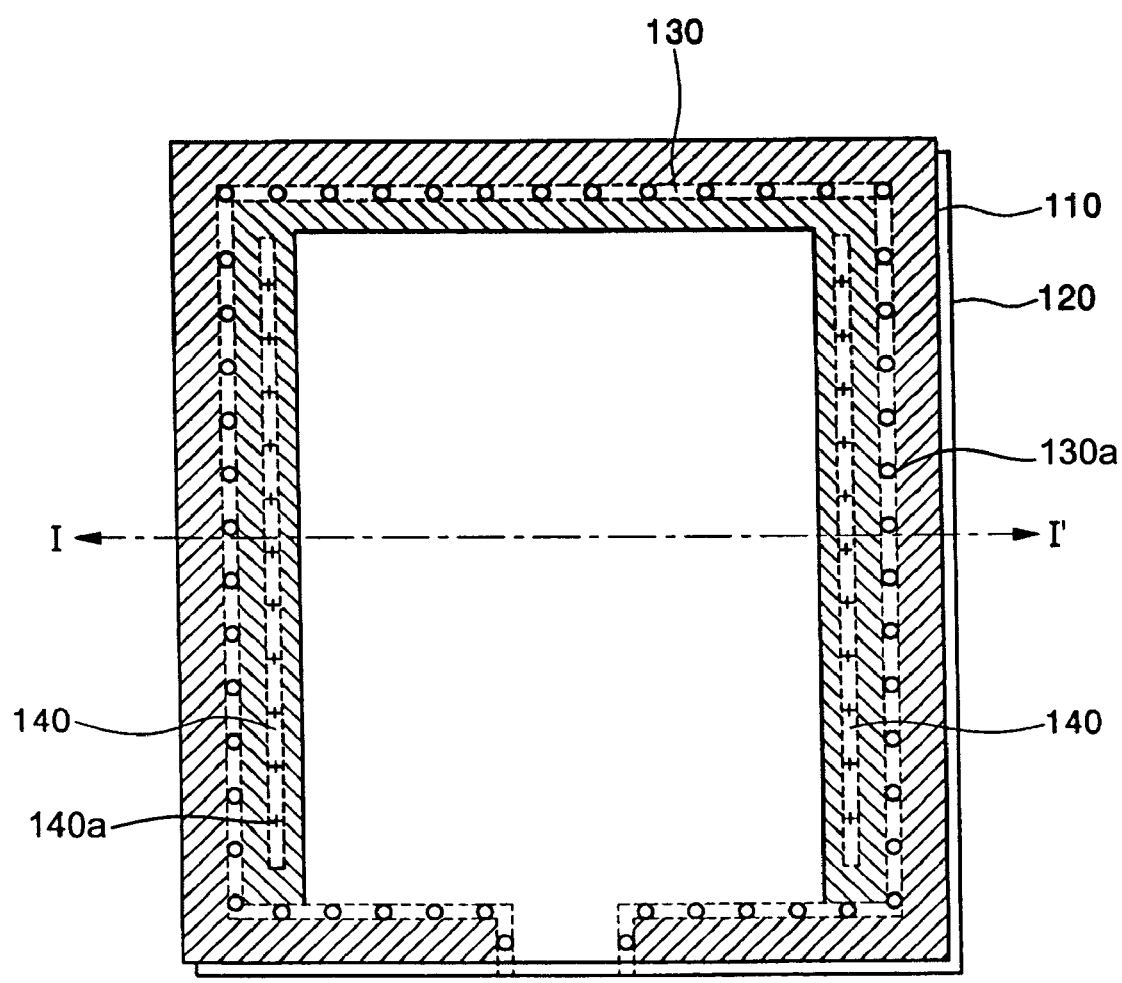
FIG. 2 is a cross-sectional view of an STN liquid crystal display according to the present invention.

FIG. 2 is a cross-sectional view of an STN liquid crystal display according to the present invention.

As illustrated in FIG. 2, an upper substrate 110 and a lower substrate 120 are sealed by seal pattern 130. Although not illustrated in FIG. 2, a plurality of spacers and liquid crystals for maintaining a cell gap are disposed in the upper and lower substrates 110 and 120, respectively, wherein the seal pattern can be in the form of at least double or more multiple seal patterns, and wherein a cell gap of the upper substrate 110 and the lower substrate 120 is stably maintained since spacers 130a (designated by "o" in FIG. 2) are mixed with sealant in the seal pattern 130.

A conductive seal pattern 140 is formed on one side surface of the seal pattern and is positioned in a region on which a wiring line is formed. Conductive spacers 140a (designated by "+" in FIG. 2) together with the sealant are included in the conductive seal pattern 140 so that the conductive seal pattern 140 plays a role in electrically connecting the upper substrate 110 and the lower substrate 120.

The conductive spacer 140a is a spacer formed of a material selected from Au, Ag, Pd, Ni, ITO and IZO, or a spacer formed by coating glass fiber with any one of the latter materials thereof having conductivity.

Figure 3:
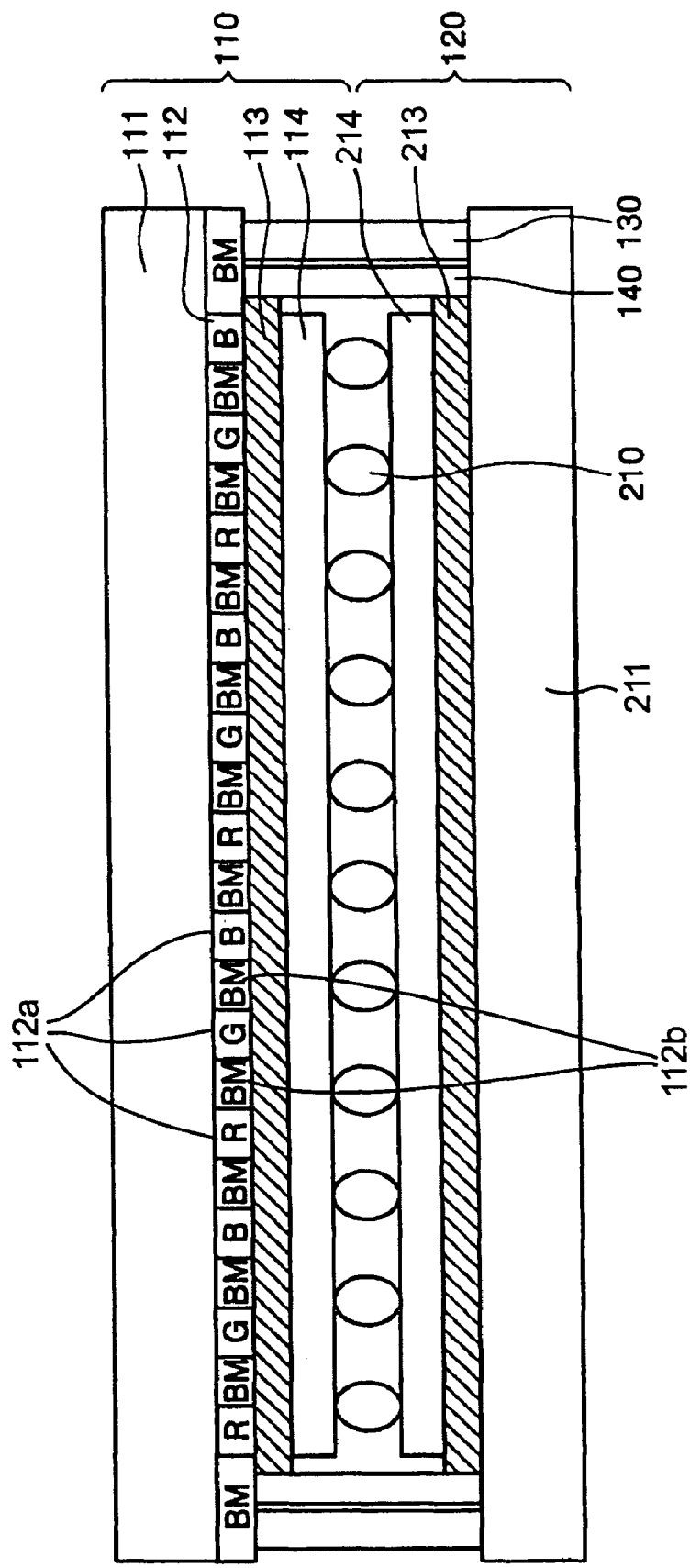
FIG. 3 is a cross-sectional view taken along line I-I' of FIG. 2 as an STN liquid crystal display.

FIG. 3 is a cross-sectional view taken along line I-I' of FIG. 2 as an STN liquid crystal display.

As illustrated in FIG. 3, upper substrate 110 and lower substrate 120 are sealed by a seal pattern 130 and a conductive seal pattern 140. A plurality of spacers 210 are disposed so as to maintain a cell gap between the upper and lower substrates 110 and 120, respectively, and liquid crystals are injected into a space between the spacers 210.

The upper substrate 110 includes a color filter layer 112 formed on a pixel region of a substrate 111.

The color filter layer 112 comprises color filter cells 112a for displaying various colors including red, green and blue, and a black matrix 112b is positioned between the color filter cells 112a, wherein the black matrix 112b is formed of resin or chromium for blocking light.

The black matrix 112b is, preferably, formed on a front surface of the substrate 111 in addition to the pixel region so that the black matrix 112b is capable of completely blocking unnecessary light. Furthermore, the black matrix 112b plays a role in relieving a bump on the upper substrate 110, and stably maintains a cell gap between the upper liquid crystal substrate 110 and the lower liquid crystal substrate 120. There may be a problem in electrically connecting the two substrates 110 and 120 since the two substrates 110 and 120 are not bonded well due to the black matrix 112b when sealing the two substrates 110 and 120 simultaneously using a seal material containing conductive spacers and spacers as in a conventional STN liquid crystal display. However, electrical short-circuiting of the two substrates 110 and 120 is prevented, and leakage of liquid crystal is completely blocked by sealing the two substrates 110 and 120 separately using a seal pattern and a conductive seal pattern to improve adhesion of the two substrates 110 and 120.

A transparent electrode pattern 113, formed of a transparent material such as indium tin oxide (ITO) is formed on a lower part of the color filter layer 112. Although not illustrated in FIG. 3, the liquid crystal display according to the present invention further comprises a protection film for preventing short-circuiting of the transparent electrode pattern 113, and an alignment layer 114 formed on a lower part of the transparent electrode pattern 113 is used to align liquid crystals.

The lower substrate 120 comprises a transparent electrode pattern 213 formed on a substrate 211, and an alignment layer 214 formed on the transparent electrode pattern.

The seal pattern 130 is formed to seal the upper substrate 110 and the lower substrate 120, wherein the seal pattern 130 is in the form of double or more multiple seal patterns of a seal pattern 130 comprising spacers for sealing the two substrates 110 and 120, and maintaining a cell gap between the two substrates 110 and 120. In addition, the conductive seal pattern 140 comprises conductive spacers positioned on one surface of the seal pattern 130, and formed in a region in which a wiring line is formed to electrically connect the two substrates 110 and 120, and to maintain a cell gap between the two substrates 110 and 120 at the same time.

Therefore, as the conductive seal pattern 140 comprises conductive spacers only, the liquid crystal display according to the present invention is capable of improving conductivity and preventing electrical short-circuit of the upper substrate 110 and the lower substrate 120, in contrast to conventional liquid crystal displays. Furthermore, the seal pattern 130 formed on the side of the conductive seal pattern 140 includes spacers so as to maintain a cell gap between the upper substrate 110 and the lower substrate 120. Furthermore, the upper liquid crystal substrate 110 and the lower liquid crystal substrate 120 are sealed by double seal patterns of the conductive seal pattern 140 and the seal pattern 130 so as to completely prevent leakage of liquid crystals by improving adhesion between the two substrates 110 and 120.

As described above, the liquid crystal display according to the present invention is capable of improving conductivity while stably maintaining a cell gap by applying double or more multiple seal patterns of a seal pattern so as to maintain a cell gap and a conductive seal pattern for electrically connecting the two substrates.

In addition, the liquid crystal display according to the present invention is capable of maintaining a cell gap more stably by forming a black matrix on the front surface of a substrate in addition to a pixel region, thereby relieving a bump on an upper substrate of the liquid crystal display.

Furthermore, the liquid crystal display according to the present invention is capable of completely preventing leakage of liquid crystals by sealing the two liquid crystal substrates using double or more multiple seal patterns.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A liquid crystal display, comprising:
   a lower substrate and an upper substrate disposed apart from each other with a space therebetween; and first and second seal patterns formed on respective opposite and peripheral sides of the lower substrate and including spacers and sealant for sealing the space between the lower and upper substrates;

wherein each of the first seal patterns comprises a plurality of spacers and each of the second seal patterns comprises a plurality of conductive spacers;

wherein the upper substrate comprises a transparent electrode pattern and an alignment layer formed on a lower part of the transparent electrode pattern;

wherein the upper substrate further comprises a substrate and a color filter layer formed on a pixel part region of the substrate, wherein the transparent electrode pattern is formed on a lower part of the color filter layer, and wherein the color filter layer comprises color filter cells and black matrices, each black matrix being positioned between a respective pair of adjacent color filter cells;

wherein each of the first and second seal patterns extends between a lower part of a respective one of the black matrices and the lower substrate, and each of the first and second seal patterns directly contacts a respective one of the black matrices, and each of the second seal patterns is closer to a center of the liquid crystal display than each of the first seal patterns; and wherein said liquid crystal display further comprises third seal patterns disposed between the second seal patterns, said third seal patterns comprising a plurality of spacers extending between the transparent electrode pattern of the upper substrate and the lower substrate.

2. The liquid crystal display according to claim 1, wherein the conductive spacers are selected from a group consisting of Au, Ag, Pd, Ni, ITO, IZO, and glass fiber coated with any one of Au, Ag, Pd, Ni, ITO and IZO.

3. The liquid crystal display according to claim 1, wherein each black matrix is formed on a front surface of the substrate in the pixel part region.

4. The liquid crystal display according to claim 1, wherein the liquid crystal display comprises one of an STN liquid crystal display and a TFT liquid crystal display.

5. A liquid crystal display, comprising:
  a lower substrate and an upper substrate disposed apart from each other with a space therebetween; and
  first and second seal patterns formed on respective opposite and peripheral sides of the lower substrate and including spacers and sealant for sealing the space between the lower and upper substrates;
  wherein each of the first seal patterns comprises a plurality of spacers and each of the second seal patterns comprises a plurality of conductive spacers;
  wherein the conductive spacers are selected from a group consisting of Au, Ag, Pd, Ni, ITO, IZO, and glass fiber coated with any one of Au, Ag, Pd, Ni, ITO and IZO;
  wherein the upper substrate comprises a substrate, a color filter layer formed on a pixel part region of the substrate, a transparent electrode pattern formed on a lower part of the color filter layer, and an alignment layer formed on a lower part of the transparent electrode pattern, and wherein the color filter layer comprises color filter cells and black matrices, each black matrix being positioned between a respective pair of adjacent color filter cells;
  wherein each of the first and second seal patterns extends between a lower part of a respective one of the black matrices and the lower substrate, and each of the first and second seal patterns directly contacts a respective one of the black matrices, and each of the second seal patterns is closer to a center of the liquid crystal display than each of the first seal patterns; and
  wherein said liquid crystal display further comprises third seal patterns disposed between the second seal patterns, said third seal patterns comprising a plurality of spacers extending between the transparent electrode pattern of the upper substrate and the lower substrate.

6. The liquid crystal display according to claim 5, wherein each black matrix is formed on a front surface of the substrate in the pixel part region.

7. The liquid crystal display according to claim 5, wherein the liquid crystal display comprises one of an STN liquid crystal display and a TFT liquid crystal display.

8. A liquid crystal display, comprising:
  a lower substrate and an upper substrate disposed apart from each other with a space therebetween; and
  first and second seal patterns formed on respective opposite and peripheral sides of the lower substrate and including spacers and sealant for sealing the spacer between the lower and upper substrates;
  wherein each of the first seal patterns comprises a plurality of spacers and each of the second seal patterns comprises a plurality of conductive spacers;
  wherein the upper substrate includes a color filter layer which comprises color filter cells and black matrices, and wherein each of the first and second seal patterns extends between a lower part of a respective one of the black matrices and the lower substrate, and each of the first and second seal patterns directly contacts a respective one of the black matrices, and each of the second seal patterns is closer to a center of the liquid crystal display than each of the first seal patterns; and
  wherein said liquid crystal display further comprises third seal patterns disposed between the second seal patterns, said third seal patterns comprising a plurality of spacers extending between the transparent electrode pattern of the upper substrate and the lower substrate.

9. The liquid crystal display according to claim 8, wherein the conductive spacers are selected from a group consisting of Au, Ag, Pd, Ni, ITO, IZO, and glass fiber coated with any one of Au, Ag, Pd, Ni, ITO and IZO.

10. The liquid crystal display according to claim 8, wherein the upper substrate comprises a substrate, a transparent electrode pattern formed on a lower part of the color filter layer, and an alignment layer formed on a lower part of the transparent electrode pattern, and wherein the color filter layer is formed on a pixel part region of the substrate, additional black matrices being provided, each additional black matrix being positioned between a respective pair of adjacent color filter cells.

11. The liquid crystal display according to claim 10, wherein each additional black matrix is formed on a front surface of the substrate in the pixel part region.

12. The liquid crystal display of claim 1, wherein the lower substrate comprises a further transparent electrode pattern, and the spacers of the third seal patterns are disposed between the transparent electrode pattern of the upper substrate and the further transparent electrode pattern of the lower substrate.

13. The liquid crystal display of claim 12, wherein the lower substrate further comprises a further alignment layer formed on an upper part of the further transparent electrode pattern, and the plurality of spacers are disposed between and contact both the alignment layer and the further alignment layer.

14. The liquid crystal display of claim 5, wherein the lower substrate comprises a further transparent electrode pattern, and the spacers of the third seal patterns are disposed between the transparent electrode pattern of the upper substrate and the further transparent electrode pattern of the lower substrate.

15. The liquid crystal display of claim 14, wherein the lower substrate further comprises a further alignment layer formed on an upper part of the further transparent electrode pattern, and the plurality of spacers are disposed between and contact both the alignment layer and the further alignment layer.

16. The liquid crystal display of claim 8, wherein the lower substrate comprises a further transparent electrode pattern, and the spacers of the third seal patterns are disposed between the transparent electrode pattern of the upper substrate and the further transparent electrode pattern of the lower substrate.

17. The liquid crystal display of claim 16, wherein the lower substrate further comprises a further alignment layer formed on an upper part of the further transparent electrode pattern, and the plurality of spacers are disposed between and contact both the alignment layer and the further alignment layer.

* * * * *